March 1, 1955      E. M. SPLAINE      2,703,036
OPHTHALMIC MOUNTING
Filed Aug. 9, 1952      2 Sheets-Sheet 1
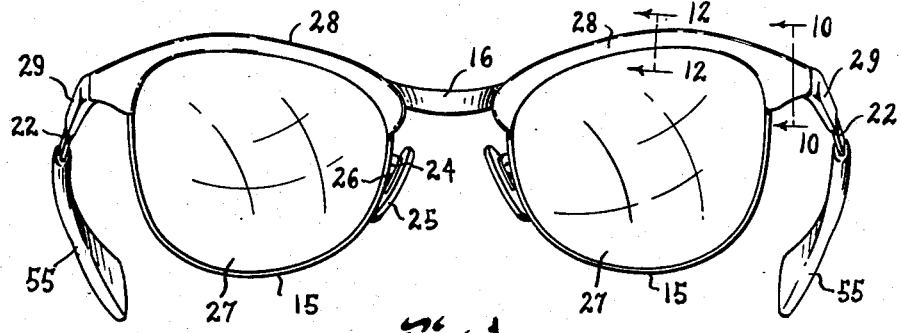
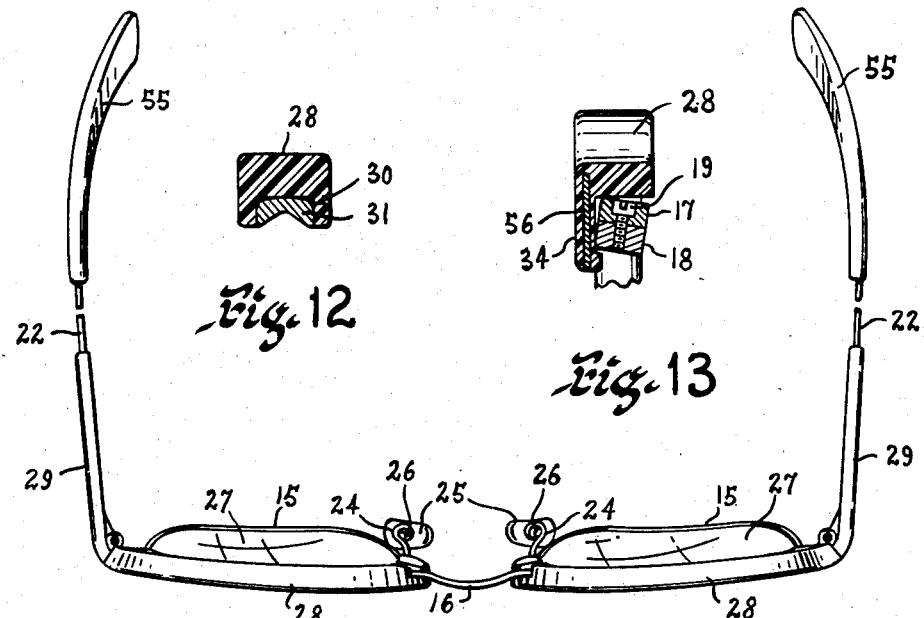
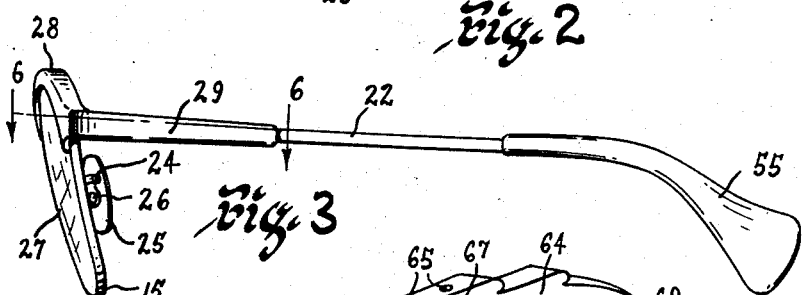
INVENTOR
EDWARD M. SPLAINE
BY
Louis L. Gagnon
ATTORNEY

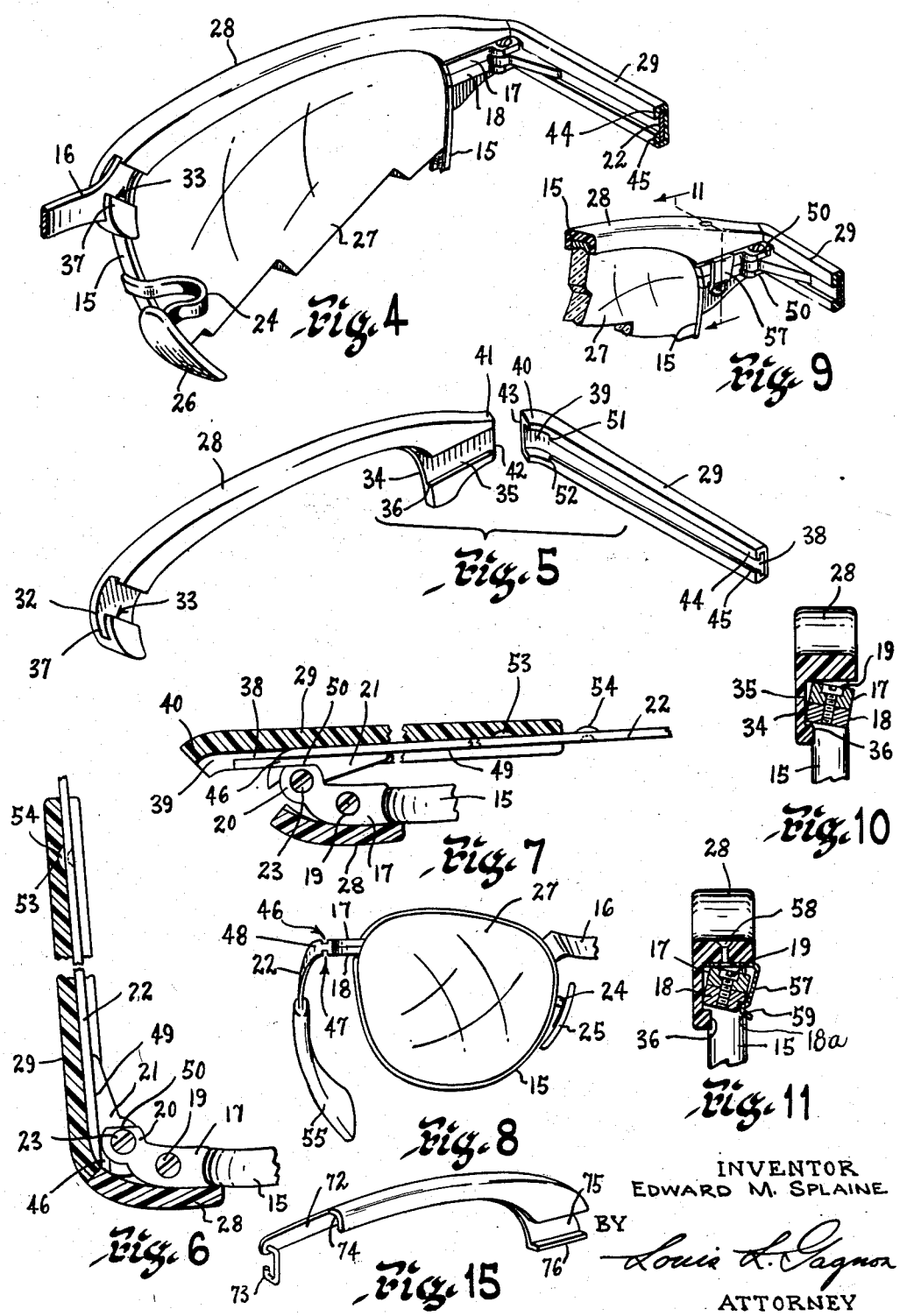

United States Patent Office 2,703,036
Patented Mar. 1, 1955

2,703,036

OPHTHALMIC MOUNTING

Edward M. Splaine, Southbridge, Mass., assignor to American Optical Company, Southbridge, Mass., a voluntary association of Massachusetts Application August 9, 1952, Serial No. 303,520

5 Claims. (Cl. 88—41)

This invention relates to improvements in ophthalmic mountings and has particular reference to an improved mounting having combined metallic and non-metallic parts.

One of the principal objects of the invention is to provide a main metallic supporting structure for the lenses of an ophthalmic mounting which may be adjusted to the requirements of different individuals and to which trims of different contour shapes and colors may be removably attached to alter the general appearance of the mounting in accordance with the esthetical effect desired by different individuals or to alter the color of the mounting in accordance with the apparel to be worn by the individual and method of making the same.

Another object is to provide a standard metallic supporting structure for the lenses of an ophthalmic mounting having its various component parts such as the bridge, nose pad supporting arms, and temples adjustable in accordance with the requirements of a particular individual for insuring that the lenses are retained in proper prescriptive position before the eyes and to which decorative trims of different contour shapes and colors may be removably attached.

Another object is to provide a main supporting structure of the above character and a plurality of trims of different contour shapes and colors which may be selectively attached to the upper portions of the rims and temples either by the dispenser of such mountings or which may be furnished in the form of a kit from which the different desired trims may be selected and interchangeably placed on the mounting by the wearer.

Other objects and advantages of the invention will become apparent from the following description taken in conjunction with the accompanying drawings and it will be apparent that many changes may be made in the details of construction, arrangement of parts, and steps of the method shown and described without departing from the spirit of the invention as expressed in the accompanying claims.

I, therefore, do not wish to be limited to the exact details of construction, arrangement of parts and steps of the method shown and described as the preferred forms only have been given in the way of illustration:

Referring to the drawings:

Fig. 1 is a front elevational view of an ophthalmic mounting embodying the invention Fig. 2 is a plan view of the mounting shown in Fig. 1;

Fig. 3 is a side elevational view of the mounting illustrated in Fig. 1;

Fig. 4 is a fragmentary rear perspective view of said mounting having some of the parts thereof shown in section;

Fig. 5 is a rear perspective view illustrating one form of decorative trim to be used with the rims and temples of the main metallic portion of the mounting;

Fig. 6 is an enlarged fragmentary plan view having portions of the trim shown in section and taken as on line 6—6 of Fig. 3;

Fig. 7 is a view generally similar to Fig. 6 showing the temple in folded position and illustrating how the trim for the temple is placed thereon;

Fig. 8 is a fragmentary front elevational view of the main metallic portion of the mounting;

Fig. 9 is a fragmentary rear perspective view similar to Fig. 4 illustrating a modification of the invention;

Fig. 10 is an enlarged sectional view taken as on line 10—10 of Fig. 1 and looking in the direction indicated by the arrows;

Fig. 11 is a view generally similar to Fig. 10 taken as on line 11—11 of Fig. 9 and looking in the direction indicated by the arrows;

Fig. 12 is an enlarged sectional view taken as on line 12—12 of Fig. 1 and looking in the direction indicated by the arrows;

Fig. 13 is a view generally similar to Fig. 10 illustrating a further modification of the invention;

Fig. 14 is a perspective view of a modified form of trim shown partially in section; and Fig. 15 is a view generally similar to Fig. 14 of a further modified form of trim.

Referring more particularly to the drawings wherein like characters of reference designate like parts throughout the several views the main metallic mounting as shown in Figs. 1, 2, 3, 6, 7, and 8 comprises a pair of lens rims 15 shaped to encircle the lenses and joined on the nasal sides by a bridge member 16. The lens rims 15 are divided on their upper temporal sides and the respective divided ends are provided with connection lugs or endpieces 17 and 18 connected by a screw member 19. The respective endpieces 17 and 18 are provided with integral perforated ears 20 to which the perforated end 21 of a temple 22 is pivotally attached as by a screw or the like 23.

On the nasal sides of each respective rim there is secured by solder or other similar means guard arms 24 to which nose guards 25 are pivotally connected as at 26.

The lenses 27 may be placed inwardly or removed from the rims 15 by loosening the connection screws 19 whereby the endpieces 17 and 18 may be spread apart an amount sufficient to position the lenses in the rims and the lenses may be held in position by tightening the screws 19.

The metallic mounting and metallic temples form the main supporting structure for the lenses and the various parts thereof may be adjusted as desired to properly fit the mounting to the requirements of the particular wearer and is such as to retain said adjustments and yet permit the attachment thereto of differently designed or differently colored decorative trims.

The decorative trims, as shown throughout the drawings, particularly Fig. 5, are in the form of non-metallic members 28 and 29. Non-metallic member 28 is shaped to and adapted to be attached to the upper portion of the lens rim while the non-metallic member 29 is shaped to and adapted to be attached to the forward end of the temple.

The non-metallic trim 28 is provided throughout its under-surface with a channel 30 shaped to receive the upper portion of the rim 31 as shown in section in Fig. 12. The channel 30 adjacent the nasal end of the trim communicates with the slot 32 which is dimensioned to receive the bridge 16, see Figs. 4 and 5. To enable the positioning of the bridge 16 inwardly of the slot 32 the rear side wall of the trim 28 is cut away as illustrated at 33 whereby the nasal end of the trim may be fitted over the bridge 16 through the entrance formed by the cut-away portion of the inner wall as illustrated at 33 whereby the bridge 16 may then be positioned in the slot 32 and the trim 28 may thence be positioned over the upper portion 31 of the eyewire with the said eyewire fitting within the channel 30. The temporal end of the trim has its rear wall cut away in communicating relation with the channel 30 to form a depending lip 34 having a shallow channel 35 therein to receive the endpieces 17 and 18. The depending lip 34, by reason of the shallow channel 35, has a shouldered portion 36 adapted to latch beneath the endpieces 17 and 18 to hold the trim 28 in assembled relation with the metallic mounting.

It is pointed out that when the trim 28 is assembled with the upper portion of the metallic mounting as illustrated in Fig. 4 the trim has a lip 37 which overlies the rear side surface of the bridge. This is due to the fact that the cut-away portion 33 of the rear side wall of the trim 28 which communicates with the slot 32 is formed adjacent the upper end of the slot thereby leaving an upwardly extending lip 37.

Due to the fact that the rim 31 has a relatively intimate fit within the channel 30 formed throughout the length of the trim and that the shouldered portion 36 extends rearwardly of the plane of the front side wall of the channel which engages the front surface of the upper portion 31 of the metallic rim, the resilient characteristics of the material 28 will cause said shouldered portion 36 to snap inwardly beneath the endpieces 17 and 18 and retain a latched relation therewith.

The trim 29 is in the form of a bar-like member having an undercut slot 38 extending longitudinally thereof and communicating with an enlarged recessed area 39 formed in the forward end of the trim 29 and in a slightly inwardly curving portion 40 shaped to communicate and to blend with the end 41 of the trim 28. Said ends 40 and 41 are provided with surfaces 42 and 43 which are shaped to abut with each other when the temples are extended. The enlarged recessed area 39 is shaped to receive and to fit with the perforated ears 20 of the endpieces 17 and 18.

Due to the fact that the longitudinal channel 38 is undercut and lies inwardly of the rear surface of the trim 29, the said inner portion of the trim 29 has spaced longitudinally extending lip members 44 and 45. To enable the trim to be placed on the forward end of the temple, the said temple, as shown in Fig. 8, is of substantially the same cross section as the slot 38 and is provided with oppositely disposed notches 46 and 47. These notches are formed in the inwardly curving end 48 of the temple so as to lie substantially in the plane of the rear surface 49 of the temple as shown in Figs. 6, 7, and 8. The trim 29 is placed on the forward end of the temple 22 by first folding the temple inwardly towards and substantially parallel with the rear plane of the lens rims, as shown in Fig. 7. The opposed longitudinal lips 44 and 45 are positioned through the notches 46 and 47 and the trim 29 is then slid inwardly along the temple to position the side portion thereof inwardly of the channel 38. The curved end 40 is moved into intimate relation with the perforated ear portions 20 of the endpieces 17 and 18 and also into intimate relation with the curved end 48 of the temple. It is particularly pointed out that the ears 20 have their rear surfaces 50 cut away or flattened in order to enable the trim 29 to be slid on to the temple when folded, as shown in Fig. 7. When the temples are in open position of use, the forward end of the trim which overlaps the curved end of the temple will prevent the trim from moving rearwardly and the inner shouldered portions 51 and 52 of the recessed area 39 will prevent forward displacement of the trim 29 through engagement with the rear of the perforated ears 20.

To further insure against displacement, the inner surface of the channel 38 in the trim 29 may be provided with a recess 53 adapted to latch with a slightly bulged projection 54 formed on the outer surface of the temple, see Figs. 6 and 7.

The temples may be provided with any desired head or ear engaging portions 55, but it is essential that the forward portions thereof be controlled as to dimension and shape to receive the trim 29.

To further assure that the depending lip 34 on the temporal end of the trim 28 retains its shape and proper resiliency, the said lip may be provided with a blade spring section 56 embedded therein, as illustrated in Fig. 13.

To further assure the latching of the temporal end of the trim 28 with the endpieces 17 and 18, the said end may be provided with an inner resilient latch member 57 attached to said end by rivets or the like 58. In this instance the lower lug 18 is provided with a recess 18a to receive an inwardly deflected end 59 formed on the resilient latch member 57. This latch member 57 therefore will function co-operatively with the shouldered portion 36 to retain the trim 28 in position of use on the upper portion of the main metallic mounting.

It is to be understood that although one particular shape or design of trim 28 has been shown only by way of illustration, several different trims of different shapes or designs may be provided and are within the scope of the present invention, it only being necessary to construct and dimension said trims as described herein in order to enable them to be detachably connected with the main metallic mounting. It is also to be understood that the said trims 28 may be formed of any desired material and in different colors and that they may be positioned in assembled relation with the main metallic mounting by the dispenser at the choice of the purchaser or wearer or may be dispensed in the form of a kit embodying trims of different shapes or designs and of different colors so as to be interchanged as desired by the wearer. This is also true of the trims 29.

It has been stated above that the trim may be formed of any desired material. This is intended to include that the trim may be formed of non-metallic, metallic, or combined metallic and non-metallic material. A trim of the latter type is shown in Fig. 14 wherein a metallic portion 60 having an inner channel extending longitudinally thereof is formed with a slot 61 inwardly of its nasal end and communicating with the longitudinal channel. The rear wall of the slotted portion 61 is cut away, as illustrated at 62, so as to form a hook-shaped end 63 for connection with the bridge member in a manner similar to the trim 28. The metallic portion 60 is connected with a non-metallic trim portion 64 by rivets, pins, or the like 65. The non-metallic trim portion has a part in overlying relation with the outer end 66 of said metallic portion 60 and has a recess 67 in which said end portion 66 is fitted. The channel of the metallic portion 60 communicates with a channel 68 formed in said non-metallic portion 64, which channel 68 communicates with a shallow groove 69 formed in a depending lip 70 on the temporal end of said non-metallic portion 64. The lip 70 has an inwardly projecting shouldered portion 71 which, when the hooked end 63 is connected with the bridge member and the channeled portions of the metallic portion 60 and non-metallic portion 64 are fitted over the upper portion of the main metallic frame, will latch beneath the endpieces in a manner similar to the trim 28. It is to be understood that the temporal end of the trim illustrated in Fig. 14 may embody the constructions shown in Figs. 11 and 13 as set forth above, and that the said trim of Fig. 14 may be formed to different contour configurations and colors as desired.

In Fig. 15 there is shown a further modification of trim which is formed of relatively thin sheet metal blanked out and bent so as to have a side portion 72 shaped to overlie the front of the upper portion of the main lens supporting frame and having secured to its nasal end a hook shaped member 73 adapted to be fitted about and connected with the bridge member in a manner similar to the end 32 of trim 28 or end 61 of the trim illustrated in Fig. 14. In this instance, however, the hook extends about the rear side of the bridge. The said trim of Fig. 15 further embodies a portion which is bent to a U-shaped cross section to provide a channel 74 overlying the upper portion of the main lens supporting frame and which communicates with a depending lip 75 having its lower end turned inwardly at 76 to fit about and latch with the endpieces. Here again this trim may be formed to different configurations and colors and the surfaces thereof, as well as the surfaces of the other trims described herein, may also be engraved or provided with other decorative treatments as desired.

It is to be understood that the upper portions of the rims of the main lens supporting frame are of a standard configuration and that the ends of the bridge which are to receive the hook-shaped portions of the trims are of a controlled shape and dimension and are secured to the rims at a fixed location and that the endpieces are also controlled dimensionally and as to position of attachment to the rims so that the connecting portions of the trims may be standardized so as to properly fit and secure the trims in position of use and permit interchangement thereof.

From the foregoing description, it will be seen that simple, efficient, and economical means have been provided for accomplishing all of the objects and advantages of the invention.

Having described my invention, I claim:

1. A lens supporting structure for an ophthalmic mounting comprising, in combination, a pair of lens supporting members each having a section shaped to follow the upper contour shape of the lenses from adjacent the nasal sides thereof to adjacent the temporal sides thereof when assembled therewith, a central bridge member having portions secured to the nasal sides of said supporting members and outwardly extending temple supports each having portions secured to the respective temporal sides of said supporting members and a pair of separate readily replaceable snap-on trims formed of inherently resilient material each having a channel extending longitudinally of the undersurface thereof shaped to relatively intimately receive only the section of the supporting members intermediate the attached end portions of the bridge and the attached portions of the temple supports and having ends terminating adjacent said portions, one of the ends of each trim having a recess in a side surface thereof communicating with said channel and shaped to receive one of said portions and having a shoulder shaped to latch therewith and the other end of said trim having a recess communicating with said channel and shaped to receive the other of said portions and having a part shaped to latch therewith by sidewise movement of said part in response to the pressing of the channel of the trim onto the upper section of the respective lens supporting member, the fit of said longitudinally extending channel with the upper portion of the supporting member functioning cooperatively with the latched ends of the trim to detachably retain said trim on said supporting member.

2. A lens supporting structure for an ophthalmic mounting comprising, in combination, a pair of metal lens rims for encircling the periphery of the lenses, said lens rims having divided ends to permit the insertion and removal of lenses and means for detachably connecting said divided ends of the lens rims, a central metallic bridge member having portions secured to the nasal sides of said lens rim and outwardly extending metallic temple supports each having portions secured to the respective temporal sides of said lens rims and a pair of separate readily replaceable snap-on trims formed of inherently resilient material each having a channel extending longitudinally of the undersurface with at least a portion thereof shaped to relatively intimately receive the section of the lens rims intermediate the attached end portions of the bridge and the attached portions of the temple supports and having ends terminating adjacent said portions, one of the ends of each trim having a recess in a side surface thereof communicating with said channel and shaped to receive one of said portions and having a shoulder shaped to latch therewith and the other end of said trim having a recess communicating with said channel and shaped to receive the other of said portions and having a part shaped to latch therewith by sidewise movement of said part in response to the pressing of the channel of the trim onto the upper section of the respective lens rim, the fit of said longitudinally extending channel with the upper portion of the lens rim functioning cooperatively with the latched ends of the trim to detachably retain said trim on the upper section of said lens rim.

3. A lens supporting structure for an ophthalmic mounting comprising, in combination, a pair of encircling lens rims each grooved on their inner side and shaped to support a lens, said lens rims being divided on their temporal sides to permit the insertion and removal of a lens, a central bridge member having portions secured to the nasal sides of said rims and outwardly extending temple supports each having separable portions secured to the divided ends of said rims on their temporal sides together with means for detachably connecting said separable portions of the temple supports to detachably retain a lens within each of the lens rims, and a pair of separate readily replaceable snap-on trims formed of inherently resilient material each having a channel extending longitudinally of the undersurface thereof shaped to relatively intimately receive only the section of the lens rims intermediate the attached end portions of the bridge and the attached portions of the temple supports and having ends terminating adjacent said portions, the nasal end of each trim having a recess in a side surface thereof communicating with said channel and shaped to receive the adjacent secured portion of the bridge and having a shoulder shaped to underlie and latch therewith, and the temporal end of said trim having a recess communicating with said channel and shaped to receive the separable portions of the temple support and having a part shaped to latch with one of said portions by sidewise movement of said part in response to the pressing of the channel of the trim onto the upper section of the respective lens rim, the fit of said longitudinally extending channel with the upper portion of the lens rim functioning cooperatively with the latched ends of the trim to detachably retain said trim on said lens rim.

4. Decorative means for the lens supporting structure of an ophthalmic mounting which comprises a pair of lens supporting members each having a section shaped to follow the upper contour shape of the lenses from adjacent the nasal sides thereof to adjacent the temporal sides thereof when assembled therewith, a central bridge member having portions secured to the nasal sides of said supporting members and outwardly extending temple supports each having portions secured to the respective temporal sides of said supporting members, said decorative means comprising a pair of separate readily replaceable snap-on trims formed of inherently resilient material each having a channel extending longitudinally of the undersurface thereof shaped to relatively intimately receive only the section of the supporting members intermediate the attached end portions of the bridge and the attached portions of the temple supports and having ends terminating adjacent said portions, one of the ends of each trim having a recess in a side surface thereof communicating with said channel and shaped to receive one of said portions and having a shoulder shaped to latch therewith and the other end of said trim having a recess communicating with said channel and shaped to receive the other of said portions and having a part shaped to latch therewith by sidewise movement of said part in response to the pressing of the channel of the trim onto the upper section of the respective lens supporting member, the fit of said longitudinally extending channel with the upper portion of the supporting member functioning cooperatively with the latched ends of the trim to detachably retain said trim on said supporting member when assembled therewith.

5. A lens supporting structure for an opthalmic mounting comprising, in combination, a pair of lens supporting members each having a section shaped to follow the upper contour shape of the lenses from adjacent the nasal sides thereof to adjacent the temporal sides thereof when assembled therewith, a central bridge member having portions secured to the nasal sides of said supporting members and outwardly extending temple supports each having portions secured to the respective temporal sides of said supporting members and a pair of separate readily replaceable snap-on trims formed of inherently resilient material each having a channel extending longitudinally of the undersurface thereof shaped to relatively intimately receive only the section of the supporting members intermediate the attached end portions of the bridge and the attached portions of the temple supports and having ends terminating adjacent said portions, one of the ends of each trim having a recess in a side surface thereof communicating with said channel and shaped to receive one of said portions and having a shoulder shaped to latch therewith and the other end of said trim having a recess communicating with said channel and shaped to receive the other of said portions, said other portion having a preshaped part and said end having a part carried thereby to latch with said preshaped part of the portion received in said recess by temporary sidewise deflection of said part in response to the pressing of the channel of the trim onto the upper section of the respective lens supporting member, the fit of said longitudinally extending channel with the upper portion of the supporting member functioning cooperatively with the latched ends of the trim to detachably retain said trim on said supporting member.

References Cited in the file of this patent

UNITED STATES PATENTS

| Number | Name | Date |
| --- | --- | --- |
| 1,301,101 | Carson | Apr. 22, 1919 |
| 2,482,195 | Martin | Sept. 20, 1949 |
| 2,495,508 | Cleaver | Jan. 24, 1950 |
| 2,566,236 | Meddoff | Aug. 28, 1951 |
| 2,577,380 | Stegeman | Dec. 4, 1951 |
| 2,599,463 | Lamb | June 3, 1952 |